United States Patent [19]
Shimizu et al.

[11] 3,904,421
[45] Sept. 9, 1975

[54] ANTICORROSIVE PAINT

[75] Inventors: Shigeki Shimizu, Ushitahiga; Wataru Shinoda; Hazime Makino, both of Hiroshima; Hiroyuki Kondo, Huruehigashi; Katuaki Okikawa, Hiroshima, all of Japan

[73] Assignee: Tada Kogyo Ltd., Japan

[22] Filed: Aug. 21, 1973

[21] Appl. No.: 390,208

[30] Foreign Application Priority Data
Aug. 30, 1972 Japan.............................. 47-87411
July 27, 1973 Japan.............................. 48-85301

[52] U.S. Cl. ............... 106/14; 106/259; 106/260; 106/304; 106/306; 260/40 R; 260/42.21; 423/594
[51] Int. Cl................................................. C09d 5/08
[58] Field of Search ............ 106/14, 304, 306, 259, 106/260; 423/594; 260/40 R, 42.21

[56] References Cited
UNITED STATES PATENTS
| | | | |
|---|---|---|---|
| 2,479,988 | 8/1949 | Williams.............................. | 106/14 |
| 3,169,937 | 2/1965 | Yashiro................................ | 106/14 |
| 3,260,609 | 7/1966 | Reeser................................. | 106/14 |
| 3,519,386 | 7/1970 | Fedock................................ | 423/594 |

Primary Examiner—Lorenzo B. Hayes

[57] ABSTRACT

An anticorrosive, antipollutant paint pigment free from lead, chromium and other pollutants and having the formula $2\,CaO \cdot Fe_2O_3$ for blending with a paint composition made up of a resin vehicle, a solvent, an extender pigment, a tinting pigment, a drier and a surface active agent. The $2\,CaO \cdot Fe_2O_3$ is in powder form prepared by mixing 40–70 percent by weight, calculated as iron oxide, of red iron oxide or other iron compound with 30–60 percent by weight, calculated as calcium oxide, of calcium carbonate or other calcium compound, calcining the mixture at a temperature of 700°–1150°C and pulverizing the resulting product.

6 Claims, 3 Drawing Figures

FIG. 2
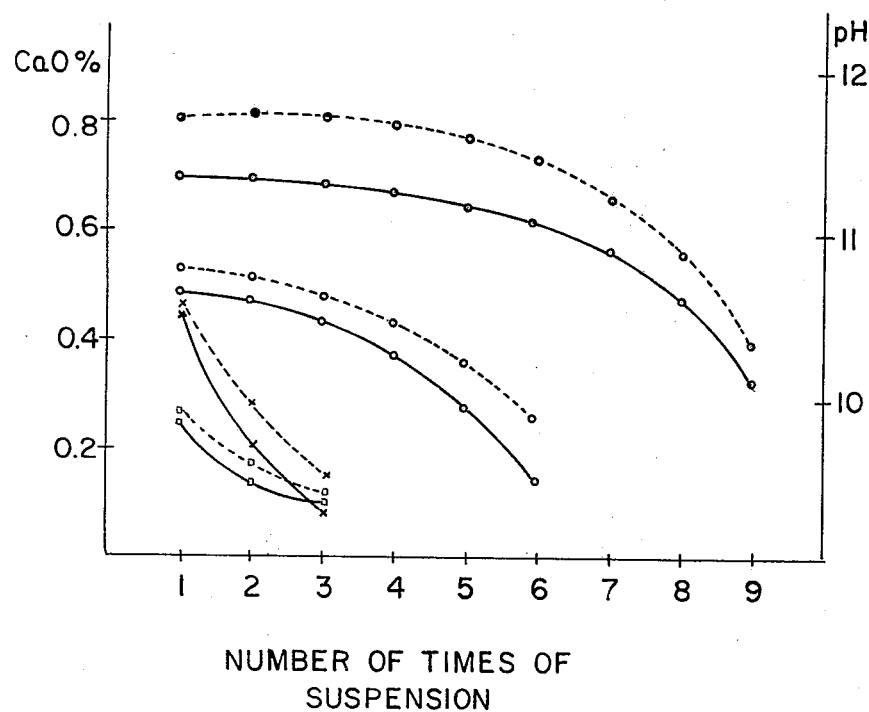
NUMBER OF TIMES OF SUSPENSION
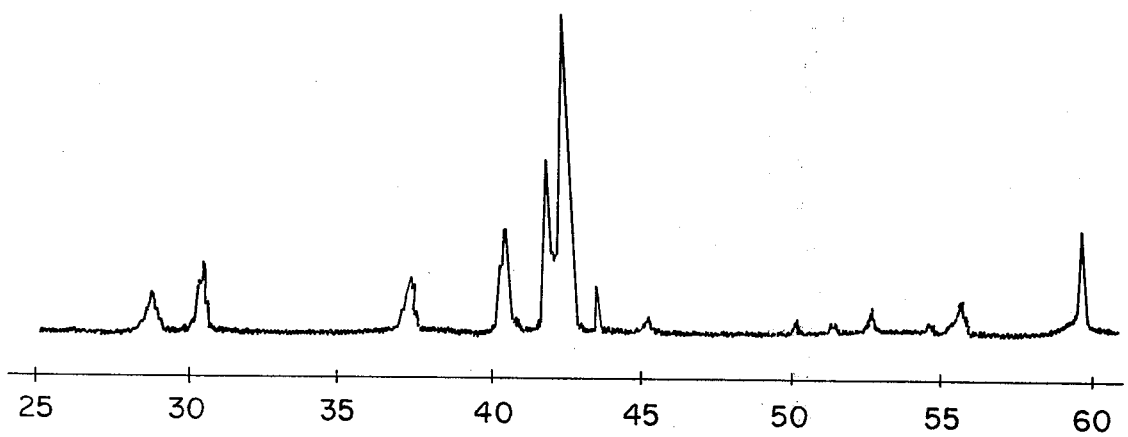
FIG. 3

ANTICORROSIVE PAINT

Conventional anticorrosive paints employ as an anticorrosive pigment with an anticorrosive effect a lead compound, such as red lead and basic lead sulfate, or a chromate compound, such as zinc chromate and strontium chromate, which is blended in the said paint composition.

However, environmental pollution due to such harmful metals as lead and chromium is recently posing a social problem and the tendency now is turning toward the regulation over the manufacture and use of red lead, basic lead sulfate, zinc chromate and strontium chromate which contain lead or chromium as their main component.

Thus, the advent of an anticorrosive paint which does not use any lead or chromate compound as anticorrosive pigment, i.e., which has no possibility of causing environmental pollution, is longed for by these industries.

An anticorrosive pigment to be blended in anticorrosive paints is required to have the following three properties.

First, an anticorrosive pigment itself must be basic. This property is essential to prevent the ionization of iron in the material painted, such as steel plates, thereby preventing the formation of rust.

If e.g. a piece of steel plate is immersed in an aqueous solution, there is a close correlation between the basicity or pH value of the aqueous solution and the extent of formation of rust or corrosion of the piece of steel plate immersed. It is well known that the higher the pH value, the less the extent of corrosion; in an aqueous solution with a pH value of 10 or higher, corrosion hardly occurs.

Secondly, an anticorrosive pigment itself must have excellent pigment characteristics. This property is essentila to keep the adhesiveness of the coated paint film from deteriorating. If it is used with an extender pigment with excellent pigment characteristics, such as red iron oxide, this property is also needed not to impair such pigment characteristics.

It is well known that the adhesiveness of the coated paint film depends largely upon the pigment volume concentration (PVC value), which is one of the pigment characteristics.

This pigment volume concentration (PVC value) is given by the following equation:
In the case of linseed oil $$PVC = \frac{100\rho b}{\rho b + 0.01\ OAr\rho p}$$

Where $OAr$ = Oil absorption value
(grams of linseed oil per 100 g of pigment)
$\rho b$ = Density of resin
$\rho p$ = Density of pigment The above equation means that the larger the PVC value, the smaller the oil absorption value, and vice versa. A pigment with a small PVC value takes too much amount of resin for the wetting of pigment surface to retain the adhesiveness with the painted surface.

Normally, one part of pigment (anticorrosive pigment only or anticorrosive pigment and extender pigment) is blended with one part of resin for the production of anticorrosive paints. As is seen from the above equation, with a pigment with an extremely small PVC value, a sufficient amount of resin would not be obtained to ensure the adhesion with the surface painted even if the pigment is insoluble to water. As a result, the coated paint film would blister and eventually peel off, thus forming a potent cause of rust formation.

For the production of anticorrosive paints, only an anticorrosive pigment is blended as pigment component in some cases, and both an anticorrosive and an extender pigment in other cases. In either case, the pigment or pigments blended must have good pigment characteristics, e.g. a suitable PVC value. This is necessary to have anticorrosive and extender pigments well dispersed in the coated paint film and to provide a tough, highly adhesive film.

Red lead typical of anticorrosive pigments, and red iron oxide typical of extender pigments have good pigment characteristics as pigments for anticorrosive paints; their PVC values are from 45 to 60 percent. It is generally admitted that red lead and red iron oxide with a PVC value of 45 to 60 percent are satisfactory in respect of pigment characteristics for use as an anticorrosive pigment for anticorrosive paints, and provides a tough, highly adhesive coated paint film which is not liable to blister and peel-off.

Thirdly, an anticorrosive pigment itself must have a reasonable solubility to water of the like. This property is essential to keep basic the surface of the painted material, such as a steel plate, for a long period of time.

This third property is extremely important and is closely related to the first and second properties. If an anticorrosive pigment has too large a solubility to water, the pigment itself will be dissolved rapidly, only temporarily making strongly basic the surface of e.g. steel plate painted. Thus, the first requirement is met. But, the dissolution of anticorrosive pigment causes the coated paint film to deteriorate, forming blister and then peel-off; the second requirement is not met. Also anticorrosive pigments insoluble to water meet the second requirement, of course, but are incapable of keeping basic the surface of the painted steel plate or the like.

It is important, therefore, that an anticorrosive pigment itself has a moderate solubility to water to satisfy the first and second requirements to such an extent as to permit practical use.

Red lead, basic lead sulfate, zinc chromate and strontium chromate have been put to practical use as anticorrosive pigments that meet these requirements though not wholly satisfactorily.

The present inventor has worked out this invention after a long search for an anticorrosive pigment which does not contain such a harmful metal as lead and chromium unlike the aforementioned four and which satisfies the three requirements.

Next, how this invention has been arrived at will be described below in connection with prior art.

The inventor set an eye on iron oxide pigments which are typified by red iron oxide ($Fe_2O_3$) well known as having good pigment characteristics. Iron oxide pigments typified by red iron oxide have so far been blended in anticorrosive paints in spite of the absence of anticorrosive effect. This is in order to get a tough coated film, a large hiding power, and a high tinting strength by taking advantage of their good pigment characteristics as extender pigment.

On the other hand, some anticorrosive pigments containing an iron oxide as their major component have already been proposed. For example, in French Patent Specification No. 1362949, a technique, (A) of using magnetic ferrite powders made from iron oxides and oxides of other metals as anticorrosive pigment is disclosed. Also, Japanese Patent Laying Open No. 22923/'72 discloses a technique (B) of using ferrite powders as anticorrosive pigment. Further, a technique (C) for the use of calcium ferrate (VI), ($CaFeO_4$) as anticorrosive pigment is disclosed in Japanese Patent Publication No. 34316/'71.

According to the specification, technique (A) utilizes a high magnetic power of magnetic ferrites ($MFe_2O_4$: M = Cu, Ni, Co, Zn, Mg, Mn) for corrosion prevention. Reportedly, magnetic ferrites with a residual of 1500 gauss or more are used and the ferrite is made to have a magnetic power by application of a magnetic field after applied to the material to be painted.

However, the production of magnetic ferrites with a residual magnetism of 1500 gauss or more requires calcination at such a high temperature makes the particle size of the magnetic ferrite powder produced larger than at least 50 microns, and makes its pigment characteristics too poor for use as material for paints, and makes milling extremely difficult to obtain excellent dispersed paints.

Furthermore, the process of applying a magnetic ferrite to the surface of material painted and thereafter applying a magnetic field to it is impractical, and almost impracticable especially when the subject to be painted is a ship.

According to the said laying open, technique (B), too, uses ferrites ($MFe_2O_4$: M = Mg, Mn, Zn, Ti, Fe, Mn-Ni, Al-Mg, Al-Zn, Mn-Mg). Since they are ferrite powders, they must be produced by calcination at a high temperature of 1200°C or more. This would make micropulverization thereof extremely difficult and make their pigment characteristics very poor. Their application for paints is, therefore, extremely difficult.

The publication describes that technique (C) uses easily soluble calcium ferrate (VI) and utilizes the production of oxygen by its reaction with water, for corrosion prevention.

The anticorrosive pain prepared by blending easily soluble calcium ferrate (VI) as anticorrosive pigment in a paint composition would, however, inevitably have poorly adhesive coated film, thus being more liable to blister and peel-off. Also, since it is easily soluble to water, it is impossible to maintain its anticorrosive effect for a long period of time. Besides, calcium ferrate (VI) requires acidic atmosphere to react with water to form oxygen. This naturally makes its application limited.

In consideration of the abovementioned situation, the inventor has pursued research on the assumption that an excellent anticorrosive pigment might be obtained by causing strongly basic metallic oxides to react with iron oxide pigments, typified by red iron oxide, which do not have the first (basicity) and third (a moderate solubility to water) properties, but which have the second property, that is, excellent pigment characteristics, thereby giving the latter the first and third properties.

Metals that produce strongly basic oxides include some of group I and group II metals in the periodic table, part of group III metals, and heavy metals including lead. But the oxides of group I metals have the disadvantage of dissolving instantaneously in water and those of heavy metals entail a danger of causing environmental pollution. The present inventor and his eye on calcium, belonging to group II, which incurs no possibility of causing environmental pollution and produces an oxide having an appropriate solubility to water.

The inventor tried to produce many kinds of compounds through the action of calcium on red iron oxide by various methods and examined them for corrosion resistance. As a result, a powder of the iron oxide-calcium oxide sintered composite produced under certain particular manufacturing conditions was found to have all of the said three properties required for anticorrosive pigments.

Namely, the powder prepared by mixing 40 to 70 percent by weight (in terms of iron oxide content) of red iron oxide with 30 to 60 percent by weight (in terms of calcium oxide content) of calcium carbonate, calcinating the mixture of 700°–1150°C, and pulverizing the product, has all of the three properties required.

A detailed explanation will be given below of how the powder satisfies the three requirements. The iron oxide-calcium oxide sintered composite produced from red iron oxide and calcium carbonate as starting materials under the particular manufacturing conditions (composition of material given in terms of the contents of oxides: $Fe_2O_3/CaO$ = 40–70 wt %/30–60 wt %, Calcination temperature: 700°–1150°C), contains 5 percent by weight or more of $2CaO.Fe_2O_3$. This compound, $2CaO.Fe_2O_3$, shows an anticorrosive effect in the following process.

Upon modification to $3CaO\ 2Fe_2O_3.nH_2O$ by reaction with water, $2CaO.Fe_2O_3$ becomes basic by elution of calcium ions; some calcium ions turn to calcium hydroxide by action of water and other to carbonate by action of carbon dioxide. Also, upon modification to $3CaO.2Fe_2O_3.nH_2O$, $2CaO\ Fe_2O_3$ hydrates to form water of crystallization. Thus, when applied to the surface of e.g. steel plate, $2CaO.Fe_2O_3$ not only keeps it basic but also forms a fine-grained film of carbonate thereon. Hydration also takes the moisture present on the surface of steel plate as water of crystallization, thus decreasing its content. By these phenomena, $2CaO.Fe_2O_3$ produces a powerful anticorrosive effect. In addition, if $2CaO.Fe_2O_3$ is applied to the surface of a steel plate that has already gotten rusty, the calcium hydroxide produced by action of water undergoes solid state reaction with $Fe_2O_3$ inrust as follows, thereby passivating rust.

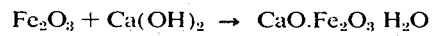

$$Fe_2O_3 + Ca(OH)_2 \rightarrow CaO.Fe_2O_3\ H_2O$$

The fact that $2CaO.Fe_2O_3$ has such an anticorrosive effect was found for the first time by the inventor. None of the compounds similar to $2CaO.Fe_2O_3$, such as $CaO.Fe_2O_3 2CaO.5Fe_2O_3$, $4CaO\ 7Fe_2O_3$, $CaO.2Fe_2O_3$, $3CaO\ Fe_2O_3$ and $4CaO.Fe_2O_3$, show such an anticorrosive effect.

$CaFeO_4$, formed by doubled decomposition accompanied by solution reaction, too, is one of similar compounds. This is used as an anticorrosive pigment in said prior art (C), but is poor in practicality. Because this compound is an easily soluble substance which reacts with water to produce oxygen.

FIG. 1 is a graph showing the solubility of the iron oxide-calcium oxide sintered composites produced from red iron oxide and calcium carbonate as starting materials. The said composites prepared from the starting materials in different composition ratios and at different calcination temperatures were pulverized (to an average particle size of 0.5 micron) into fine powders, which were used as samples.

Twenty grams of each sample was weighed out, suspended in 200 ml of water, and boiled for 30 minutes. The dissolved calcium was determined as calcium oxide and its percentage to 20 grams of the weighed sample was computed. In FIG. 1 the percentage of calcium oxide formed to the sample is plotted as ordinate and the composition ratio of iron oxide to calcium oxide as abscissa. The dot in the figure indicates the percentage of calcium oxide formed by calcination of only calcium carbonate to the sample. The range between the dotted lines represents the said particular manufacturing conditions.

From FIG. 1, it will be understood that the iron oxide-calcium oxide sintered composite produced under the said particular manufacturing conditions does not have so large a solubility as calcium oxide but a moderate one, and shows a basicity upon dissolution in water. This is because the said composite contains $2CaO \cdot Fe_2O_3$.

The powder prepared by pulverization of the iron oxide-calcium oxide sintered composite produced from red iron oxide and calcium carbonate as starting materials under the aforesaid particular manufacturing conditions satisfies the first requirement for anticorrosive pigments, since it contains $2CaO \cdot Fe_2O_3$ having such an anticorrosive effect as described above. Since red iron oxide is used as a starting material and the calcinating temperature is lower than 1150°C, it also has pigment characteristics equivalent to those of red iron oxide, thus meeting the second requirement, too. It shows a PVC value of 45 to 60 per cent.

Next, whether or not it meets the third requirement for anticorrosive pigments regarding solubility to water will be described below. As previously mentioned, $2CaO \cdot Fe_2O_3$ assumes basicity by dissolution of calcium ions as soon as it modifies to $3CaO \cdot 2Fe_2O_3 \cdot nH_2O$ by reaction with water; the dissolved ions turn to calcium hydroxide by action of water. As is apparent from the solubility product of calcium hydroxide, the amout of calcium ions present is defined by the amount of moisture present in a basic solution. If the amount of water present is fixed, the formation of calcium hydroxide from $2CaO \cdot Fe_2O_3$ proceeds in an equilibrium state. $(2CaO \cdot Fe_2O_3 + H_2O \rightleftarrows 3CaO \cdot 2Fe_2O_3 \cdot nH_2O + Ca(OH)_2, Ca(OH)_2 \rightleftarrows Ca^{++} + 2(OH)^{-})$ Thus, when the surface of steel plate is coated with paint film containing $2CaO \cdot Fe_2O_3$, $2CaO \cdot Fe_2O_3$ produces calcium hydroxide while establishing an equilibrium state with water than permeats through the resin films; therefore the dissolution of $2CaO \cdot Fe_2O_3$ itself goes on slowly over a long period of time. It is by this phenomenon that its anticorrosive effect is maintained for a long time. This fact that $2CaO \cdot Fe_2O_3$ retains an anticorrosive effect for a long time, too, was found out for the first time by the inventor.

The powder of the iron oxide-calcium oxide sintered composite produced from red iron oxide and calcium carbonate as starting materials under the aforesaid particular manufacturing conditions meets the third requirement, too, because it contains $2CaO \cdot Fe_2O_3$ having such properties as mentioned above.

FIG. 2 shows the solubility and sustenance thereof of the iron oxide-calcium oxide sintered composite produced from red iron oxide and calcium carbonate as starting materials. The samples used were the powders obtained by pulverization (to an average particle size of 0.5 micron) of the iron oxide-calcium oxide sintered composites produced from the starting materials in different $Fe_2O_3/CaO$ ratios at different calcination temperatures.

Twenty grams of each sample was weighed out and suspended in 200 ml of water. After boiled for 30 minute, each suspension was filtered. The amount of dissolved calcium was determined as calcium oxide and the percentage thereof to 20 grams of the weighed sample was figured and plotted. The pH value of the filtrate was also measured and plotted. Then, the total amount of the undissolved portion was boiled under the same conditions as above. The amount of dissolved calcium was similarly determined as calcium oxide, and the percentage thereof to 20 grams of the first weighed sample was figured. The pH value of the filtrate was again measured and plotted. This process was repeated nine times.

In FIG. 2 the percentage of calcium oxide to the weighed sample is plotted as left ordinate, the pH value of the filtrates as right ordinate, and the number of times of suspension as abscissa. The line □—□ in the figure shows the solubility of the iron oxide-calcium oxide sintered composite containing 2 wt. percent of $2CaO \cdot Fe_2O_3$, produced under the following conditions: $Fe_2O_3/CaO$ = 74 wt %/26 wt %, Calcinating temperature: 1100°C; the line X—X for the composite containing 2 wt percent of $2CaO \cdot Fe_2O_3$, produced under the conditions: $Fe_2O_3/CaO$ = 74 wt %/ 26 wt %, Cal. tem.: 700°C; the line O—O for that containing 5 wt percent of $2CaO \cdot Fe_2O_3$, produced under the conditions: $Fe_2O_3/CaO$ = 70 wt %/ 30 wt percent, Cal. tem.: 700°C; the line ●—● for that containing 60 wt percent of $2CaO \cdot Fe_2O_3$, produced under the conditions: $Fe_2O_3/CaO$ = 58.5 wt %/41.5 wt %, Cal. temp.: 900°C. The lines □—□, X—X, O—O, and ●—● show the pH values for those composites, respectively. The iron oxide-calcium oxide sintered composites for which the lines O—O and ●—● are, are those produced under the aforesaid particular manufacturing conditions.

From FIG. 2 it will be understood that the iron oxide-calcium oxide sintered composite produced under the aforesaid particular manufacturing conditions has an appropriate solubility and, even after repetition of many times of suspension and boiling, still has an effective solubility. This is because it contains 5 wt percent or more of $2CaO \cdot Fe_2O_3$. It is also understood that with the iron oxide-calcium oxide sintered composite containing only about 2 wt 3. of $2CaO \cdot Fe_2O_3$, the dissolution of calcium is no more observed after only three times of suspension and boiling. This means that long-term corrosion resistance is not assured. There is no noticeable difference between the composite containing 5 wt percent of $2CaO \cdot Fe_2O_3$ and that with a much larger $2CaO \cdot Fe_2O_3$ content.

This invention has been worked out on the basis of the abovementioned facts found by the inventor. A detailed explanation of the present invention will be given below.

This invention provides an anticorrosive paint comprising a powder prepared by pulverizing the iron oxide-calcium oxide sintered composite containing 5 wt percent or more of $2CaO \cdot Fe_2O_3$ obtained by mixing 40 to 70 wt percent (in terms of iron oxide content) of an iron coumpound selected from the group consisting of $Fe_2O_3$, $Fe_3O_4$ and FeOOH with 30 to 60 wt percent (in terms of calcium oxide content) of a calcium compound selected from the group consisting of calcium carbonate, calcium hydroxide and calcium oxide, and calcinating the mixture at a temperature of 700° to 1150°C, blended as an anticorrosive pigment in a paint composition.

First, referring to the starting materials, an iron compound, one of the starting materials, may be selected from among $Fe_2O_3$, $Fe_3O_4$ and FeOOH. $Fe_2O_3$ is an iron compound well known in the name of red iron oxide, typical of the iron oxide pigments. The reason why red iron oxide has been selected as one of the starting materials in this invention is as mentioned previously. $Fe_3O_4$ and FeOOH, too, are used as iron oxide pigments the former is well known as one of black pigments, and the latter as one of yellow pigments. Both have pigment characteristics equivalent to those of $Fe_2O_3$ and, when calcinated at a temperature of 700° to 1150°C, change to $Fe_2O_3$. Thus, they act in quite the same manner as $Fe_2O_3$ when used as a starting material in this invention. These three materials may also be used singly or together, of course. Among other iron compounds easily available are $FeSO_4$, $FeCl_2$ and $Fe(NO_3)_2$, but they are unsuitable as starting materials for this invention because they are strong acid salts.

As a calcium compound, the other starting material, any one that decomposes at 700° – 1150°C and reacts with said iron compound will do, but calcium carbonate, calcium hydroxide and calcium oxide have been preferred. One, or two or more, of them may be used. Although calcium sulfate and calcium chloride, too, are included in calcium compounds, they are unsuitable as starting materials for this invention because they are strong acid salts.

Next, the composition ratio between the starting materials will be referred to. It is important in the present invention One, or two or more kinds of iron compounds selected from the group consisting of $Fe_2O_3$, $Fe_3O_4$ and FeOOH and one or two or more kinds of calcium compounds selected from the group consisting of calcium carbonate, calcium hydroxide, and calcium oxide must be blended together with the content of the former being 40–70 wt percent (in terms of iron oxide content) and that of the latter being 3–60 wt percent (in terms of calcium oxide content). The reason for this will be described below.

The conditions under which $2CaO \cdot Fe_2O_3$ is formed have already been clarified. It is known that $2CaO \cdot Fe_2O_3$ is formed in an almost 100 percent yield by calcination of 58.5 wt percent (in terms of iron oxide content) of an iron compound mixed with 41.5 wt percent (in terms of calcium oxide content) of a calcium compound, at a temperature of 1100°C or higher. It is also known that the amount of $2CaO \cdot Fe_2O_3$ formed decreases with an increase in the content of iron compound; and that for 74.1 wt percent or more (in terms of iron oxide content) $2CaO \cdot Fe_2O_3$ is no more produced at all, and for less than 58.5 wt percent (in terms of iron oxide content) $2CaO \cdot Fe_2O_3$ is formed in an amount corresponding to the amount of iron compound, but leaving some amount of unreacted calcium oxide.

First, the reason why the upper limit of composition ratio between the starting materials has been fixed will be explained. In this invention it is required that the iron oxide-calcium oxide sintered composite contain $2CaO \cdot Fe_2O_3$, and that its content be at least 5 wt percent. If the content were less than 5 wt percent, the composite could not retain anticorrosive effect for a long time as an anticorrosive pigment. This fact is apparent from FIG. 2, which shows that there is a marked difference in the sustenance of dissolution of calcium between the iron oxide-calcium oxide sintered composite containing 5 wt percent of $2CaO \cdot Fe_2O_3$ and that containing only 2 wt percent of it. There is no noticeable difference in anticorrosive effect between that containing 5 wt percent or more of $2CaO \cdot Fe_2O_3$ and that with a much larger content as is seen from the Examples.

In order to obtain an iron oxide-calcium oxide sintered composite containing 5 wt percent or more of $2CaO \cdot Fe_2O_3$, it is required that 70 wt percent or less (in terms of iron oxide content) of an iron compound and 30 wt percent or more (in terms of calcium oxide content) of a calcium compound be used as starting meterials.

Next, the reason why the lower limit of composition ratio between the starting materials has been fixed will be given. In this invention the iron oxide-calcium oxide sintered composite is required to have an appropriate solubility of calcium. This requirement is met only if it contains $2CaO \cdot Fe_2O_3$, and as preciously mentioned, the sustenance of solubility is assured if its $2CaO \cdot Fe_2O_3$ content is 5 wt percent or more. If the content of iron compound in the starting mixture were less than 58.5 wt percent (in terms of iron oxide content), however, the product would have too large a solubility of calcium because of increase in the amount of the unreacted calcium oxide in it. Though the unreacted calcium oxide is one of the components of the iron oxide-calcium oxide sintered composite, too large an amount of it weakens the extent of sintering, thus resulting in increased dissolution of calcium. This fact is obvious from FIG. 1, which shows that for the iron compound content of 40 wt percent or less (in terms of iron oxide content) and the calcium compound content of 60 wt percent or more (in terms of calcium oxide content), the amount of dissolved calcium increases sharply. The iron oxide-calcium oxide sintered composite containing an extremely large amount of unreacted calcium oxide also has the smaller content of iron oxide, thus having the poorer pigment characteristics when pulverized.

Thus, the starting materials to be blended must be 40 wt percent or more (in terms of iron oxide content) of an iron compound and 60 wt percent or less (in terms of calcium oxide content) of a calcium compound in order to get an appropriate solubility of calcium and obtain a powder with good pigment characteristics.

Next, referring to the calcinating temperature, it must be between 700° and 1150°C. The reason is as follows. Higher calcinating temperatures than 1150°C would cause excessive particle growth on the iron oxide-calcium oxide sintered composite, which would lose its solubility.

The composite which has undergone excessive particle growth is extremely difficult to pulverize; it is impossible to pulverize it to an average particle size of 0.5–1 micron, required for pigment.

On the other hand, with a calcinating temperature of lower than 700°C, $2CaO \cdot Fe_2O_3$ would not be formed, nor would iron oxide-calcium oxide sintered composite; the product would be a mere mixture of iron oxide, calcium oxide, and some undecomposed substances in the starting materials.

By calcination at a temperature of 700° to 1150°, if the said starting materials used are in the said ratio, the iron oxide-calcium oxide sintered composite with a $2CaO \cdot Fe_2O_3$ content of 5 wt percent or more can be obtained, which has particles not excessively grown, has an appropriate solubility of calcium and sustenance thereof, is easy to pulverize to an average particle size of 0.5–1 micron by means of known pulverizing means, e.g. a hammer mill, and has excellent pigment characteristics (e.g. a PVC value of 45–60 percent).

By pulverizing the iron oxide-calcium oxide sintered composite with a $2CaO \cdot Fe_2O_3$ content of 5 wt percent or more produced under the manufacturing conditions described above in detail, by means of ordinary pulverizing means to an average particle size of 0.5–1 micron, an anticorrosive pigment can be obtained which has all of three properties required for anticorrosive pigments.

Although, as is apparent from FIGS. 1 and 2 and is illustrated by the Examples bellow, an anticorrosive pigment with excellent performance can be produced provided the manufacturing conditions are within the ranges specified above (for the ratio between the starting materials expressed in terms of the contents of oxides, and the calcinating temperature), it is advantageous from the industrial standpoint to adopt the following manufacturing conditions.

As starting materials, $Fe_2O_3$ and calcium carbonate are most easily availble and advantageous in cost.

As for the composition of starting mixture, it is advantageous in quality and cost to blend 55–65 wt percent (in terms of iron oxide content) of $Fe_2O_3$ with 35–45 wt percent (in terms of calcium oxide content) of calcium carbonate. The most advantageous composition is 58.5 wt percent of $Fe_2O_3$ and 41.5 wt percent of calcium carbonate; with this composition the iron oxide-calcium oxide sintered composite a large portion of which is $2CaO \cdot Fe_2O_3$ can be obtained by calcination at 1100°C, and the composite with a $2CaO \cdot Fe_2O_3$ content of about 60 wt percent by calcination at 900°C.

As for the calcinating temperature, the temperature range of 800°–1100°C is advantageous in ease of pulverization and cost. The most advantageous temperature is 900°C, with which complete reaction and great ease of pulverization are assure.

Blending a powder of the iron oxide-calcium oxide sintered composite with a $2CaO \cdot Fe_2O_3$ content of 5 wt percent or more in a paint composition as an anticorrosive pigment gives an anticorrosive paint, the object of the present invention.

The paint composition used in the present invention may be a well-known one in common use as a paint composition for anticorrosive paint; it contains a vehicle (resin) and a solvent as essential ingredients, to which an extender pigment, a colored pigment, a drier, a surface active agent, etc. are added as required.

As a vehicle (resin), any in general use for anticorrosive paints, whether natural or synthetic, oil-soluble or water-soluble, may be used. Among typical vehicles are linseed oil, alkyd resins, vinyl chloride resins, epoxy resins, phenol resins, urethane resins, and butyral resins. One may be selected not only from them but also from other known resins according to the purpose.

As a solvent, one suited for the resin used may be selected from known solvents. Among typical solvents are aceton, toluene, diaceton alcohol, mineral sprit and ion-exchanged water.

As extender and colored pigments, any ones in general use for anticorrosive paints may be used. One may be selected from known pigments according to the purpose. Among typical extender and colored pigments are iron oxide pigments such as $Fe_2O_3$, $Fe_3O_4$ and FeOOH, calcium carbonate powder, zinc white, titan white and clay.

As a drier, one suited for the resin used may be selected from known driers. Among typical driers are naphthenates of cobalt, lead, zinc and manganese, and linolenates of cobalt, lead, zinc and manganese.

As a surface active agent, one capable of improving the kneadability of anticorrosive, extender and colored pigments used may be selected from known surface active agents. It may not be used if unnecessary.

Various additions in general use for anitcorrosive paints, such as a plasticizer, an antisettle agent and an antiflooding agent, may be added to the aforesaid paint composition, of course.

The proportion in amount between the vehicle (resin), solvent, extender pigment, colored pigment, drier and surface active agent in the said paint composition may be similar to that in known anticorrosive paints. Many concrete examples of such a proportion are given in the Examples below.

The blending of the anticorrosive pigment of the present invention, that is, a powder of the iron oxide-calcium oxide sintered composite with a $2CaO \cdot Fe_2O_3$ content of 5 wt percent or more in the aforesaid paint composition may be done in the same manner as in well-known paint manufacturing process; the anticorrosive paint, the object of the present invention, can be obtained by blending the acticorrosive pigment of the present invention in the paint composition prepared to a desired prescription and having it well dispersed by use of a ball mill or the like.

Because the anticorrosive pigment of this invention has excellent anticorrosive power, the amount required to be blended is small compared with conventional pigments as is obvious from the Examples and the Comparison Examples.

If it is blended so as to give its content in the coated film of at least 5 wt percent, though depending upon the purpose, a sufficient anticorrosive effect is obtained. Also, there is little difference in anticorrosive effect between the anticorrosive paint containing a powder of iron oxide-calcium oxide sintered composite with a $2CaO \cdot Fe_2O_3$ content of 5 wt percent or more and that containing a powder of the said composite with a much larger $2CaO \cdot Fe_2O_3$ content; as is seen from the Examples below, whether the $2CaO \cdot Fe_2O_3$ content is 5 wt percent or 90 wt percent, a practical degree of anticorrosive effect is achieved. Theoretically it is considered that the larger the $2CaO \cdot Fe_2O_3$ content the larger the anticorrosive effect, but practically there is little difference in anticorrosive effect in the range from 5 wt percent up.

The anticorrosive paint of the present invention described above has the following advantages:

i. The anticorrosive paint of the present invention does not contain any lead or chromate compounds as an anticorrosive pigment, thus having no possibility of causing environmental pollution due to harmful metals such as lead and chromium or of having harmful effect on human body.

ii. It retains anticorrosive power equivalent or superior to the anticorrosive paints containing red lead, zinc chromate or the like, as an anticorrosive pigment, for a long period of time.

iii. It has little possibility of suffering from deterioration of the coated film or decrease in adhesiveness thereof attributable to the anticorrosive pigment blended.

iv. It does not require the removal of rust, if any, from the surface to be painted, before application. The present invention will be illustrated by reference to the following examples.

EXAMPLE 1

First, 1000 g. of $Fe_2O_3$ (red iron oxide) powder was well mixed with 1270 g. of $CaCO_3$ powder. By calcination of the mixture in an electric furnace at 900°C for four hours, iron oxide-calcium oxide sintered composite with the ratio of iron oxide to calcium oxide of 58.5:41.5 was obtained. Analysis by X-ray diffraction showed that the composite contained 60 wt percent of $2CaO \cdot Fe_2O_3$.

FIG. 3 shows an X-ray diffraction diagram of the composite. The said sintered composite was then pulverized in a hammer mill to a powder with an average particle size of 0.5 micron. The PVC value of the powder was 58 percent. Then, 1140 g. of anticorrosive paint was prepared by blending 70 g. of the powder of the iron oxide-calcium oxide sintered composite containing 60 wt percent of $2CaO \cdot Fe_2O_3$ thus produced as an anticorrosive pigment in the paint composition prepared to the following prescription and having it well dispersed in the composition by use of a ball mill.

| Vehicle | Vinyl chloride resin | 150 g. |
| Solvent | Aceton;Toluene (1/1) | 760 g. |
| Extender pigment | Red iron oxide | 150 g. |
| Plasticizer | Tricrecyl phosphate | 10 g. |

The anticorrosive paint thus prepared was applied to a rust-free, fat-removed steel plate to a thickness of about 100 microns. The steel plate painted was kept dipped in a 3 percent salt solution kept at 40°C for a period of three months to test it for corrosion resistance. By observation of the coated film surface, the number of days until blister starts to be formed and the extent of blister after 3 months (blistered area/total painted area × 100) were determined.

No blister was observed on the coated film of the aforesaid paint after three months.

EXAMPLES 2 to 10

Anticorrosive pigments were prepared in the same manner as in Example 1 except that the starting materials, mixing ratio, and calcination temperature were varied. The resultant anticorrosive paints were tested for corrosion resistance in the same manner as in Example 1. The properties of the anticorrosive pigments and the test results are shown in Table 1. In Example 8, the sintered composite was pulverized to an average particle size of 0.9 micron instead of 0.5 micron.

COMPARISON EXAMPLE 1

An anticorrosive pigment was prepared in the same manner as in Example 1 except that the calcinating temperature was 1200°C. The composite produced could not be pulverized to a sufficiently small particle size for use in paint. Only the PVC value is shown in Table 1.

COMPARISON EXAMPLE 2

An anticorrosive pigment was prepared in the same manner as in Example 1 except that 710 g. of calcium oxide was used and that the mixture was not calcinated. The paint prepared was tested in the same manner as in Example 1. The properties of the pigment and the test results are shown in Table 1.

COMPARISON EXAMPLE 3

The paint prepared by blending red iron oxide with an average particle size of 0.5 micron instead of the anticorrosive pigment in Example 1 in the same paint composition as used in Example 1 was tested in the same manner as in Example 1. The test results are shown in Table 1.

COMPARISON EXAMPLE 4

The paint prepared by blending red lead instead of the anticorrosive pigments in Example 1 in the same paint composition as used in Example 1 was tested in the same manner as in Example 1. The test results are shown in Table 1.

(Table 1)

| | Materials & their amounts (g.) | $Fe_2O_3/CaO$ in sintered composite (wt. ratio) | $2CaO \cdot Fe_2O_3$ content of sintered composite (wt. %) | Calcinating temperature (°C) | PVC value (%) | Corrosion resistance test results | |
|---|---|---|---|---|---|---|---|
| | | | | | | No. of days until blister first formed on coated film (day) | Extent of blister after 3 months Blistered area/total painted area × 100 (%) |
| Ex. 2 | $Fe_2O_3 \cdot CaCO_3$ 1000 . 1270 | 58.5/41.5 | 15 | 700 | 54 | 60 | 15 |
| Ex. 3 | $Fe_2O_3 \cdot CaCO_3$ 1000 . 1270 | 58.5/41.5 | 90 | 1100 | 60 | No blister formed | |
| Ex. 4 | $Fe_2O_3 \cdot CaCO_3$ 1000 . 960 | 65/35 | 30 | 900 | 56 | 75 | 10 |
| Ex. 5 | $Fe_2O_3 \cdot CaCO_3$ 1000 . 1450 | 55/45 | 40 | 900 | 56 | 80 | 5 |
| Ex. 6 | $Fe_2O_3 \cdot CaCO_3$ 1000 . 720 | 70/30 | 5 | 700 | 60 | 75 | 5 |
| Ex. 7 | $Fe_2O_3 \cdot CaCO_3$ 1000 . 2700 | 40/60 | 30 | 900 | 54 | 60 | 10 |
| Ex. 8 | $Fe_2O_3 \cdot CaO$ 1000 . 710 | 58.5/41.5 | 50 | 900 | 55 | No blister formed | |

(Table 1) — Continued

| | Materials & their amounts (g.) | $Fe_2O_3/CaO$ in sintered composite (wt. ratio) | $2CaO \cdot Fe_2O_3$ content of sintered composite (wt. %) | Calcinating temperature (°C) | PVC value (%) | Corrosion resistance test results | |
|---|---|---|---|---|---|---|---|
| | | | | | | No. of days until blister first formed on coated film (day) | Extent of blister after 3 months Blistered area/total painted area × 100) (%) |
| Ex. 9 | $Fe_3O_4 \cdot Ca(OH)_2$ 1000 . 970 | 58.5/41.5 | 70 | 900 | 54 | No blister formed | |
| Ex. 10 | $FeOOH \cdot CaCO_3$ 1000 . 1120 | 58.5/41.5 | 70 | 900 | 49 | No blister formed | |
| Com. ex. 1 | $Fe_2O_3 \cdot CaCO_3$ 1000 . 1270 | 58.5/41.5 | About 100 | 1200 | 69 | | |
| Com. ex. 2 | $Fe_2O_3 \cdot CaO$ 1000 . 710 | | | | 44 | 20 | 80 |
| Com. ex. 3 | Red iron oxide | | | | 54 | 5 | 80 |
| Com. ex. 4 | red lead | | | | 60 | 60 | 12 |

EXAMPLE 11

By blending as an anticorrosive pigment 70 g. of the powder (average particle size: 0.5 micron) of the iron oxide-calcium oxide composite containing 60 wt percent of $2CaO \cdot Fe_2O_3$ prepared in Example 1 in the paint composition prepared to the following prescription and having it well dispersed by use of a ball mill, 724 g. of anticorrosive paint was obtained.

| Vehicle | Alkyd resin (Japan Reich Hold Ltd J-611) | 150 g. |
|---|---|---|
| Solvent | Mineral spirit | 350 g. |
| Extender pigment | Red iron oxide | 150 g. |
| Drier | 6% cobalt naphthenate solution | 2 g. |
| | 24% lead naphthenate solution | 2 g. |

The anticorrosive paint thus prepared was applied to a rust-free, fat-removed steel plate to a thickness of about 100 microns. The steel plate painted was kept dipped in a 3 percent salt solution kept at 40°C for a period of 30 days to test it for corrosion resistance. By observation of the coated film surface, the number of days until formation of blister is first observed and the extent of blister at the end of dipping (on the 30th day) (blister area/total painted area × 100) were determined.

In this case, blister was first observed to have been found on the coated film on the 25th day and the proportion of the blistered area to the total painted area was 10 percent at the end of dipping (after 30 days). The content of anticorrosive pigment in the dried film was 19 percent.

EXAMPLES 12 to 16

The same anticorrosive pigment as in Example 11 was used. Anticorrosive paints were prepared by blending different amounts of it in paint compositions prepared to different prescriptions. The paints were tested in the same manner as in Example 11, varying the film thickness, the temperature of salt solution and the dipping time. The composition of paints, content of anticorrosive pigment in dried film, and the test results are shown in Table 2.

In Example 14, after applied, the anticorrosive paint was baked at 160°C for 30 minutes and thereafter tested.

COMPARISON EXAMPLES 5 to 10

Instead of the anticorrosive pigment used in Examples 11 to 16, equivalent amounts of red iron oxide or $CaCO_3$ were used. The composition of the paints and the results of the corrosion resistance test are shown in Table 2. In comparison Example 8, after applied, the paint was baked at 160°C for 30 minutes as in Example 14.

COMPARISON EXAMPLE 11

Instead of the anticorrosive pigment in Example 11, 70 g. of zinc chromate was used. The paint prepared by use of the paint composition used in Example 11 was tested in the same manner as in Example 11. The test results are shown in Table 2.

COMPARISON EXAMPLE 12

Instead of the anticorrosive pigment in Example 11, 110 g. of red lead was used. The paint prepared by use of the paint composition used in Example 11 was tested in the same manner as in Example 11. The test results are shown in Table 2.

(Table 2)

| | Anticorrosive pigment (g.) | Vehicle (resin) (g.) | Solvent (g.) | Extender pigment (g.) | Drier (g.) |
|---|---|---|---|---|---|
| Ex.12 | in Ex.1 30 | epoxy ester 150 | mineral spirit 350 | red iron oxide 200 | 6% Co-naphthenate 2 24% Pb-naphthenate 2 |
| Ex.13 | in Ex.1 70 | vinyl chloride 150 | aceton:toluen (1:1) 760 | $CaCO_3$ 150 | |
| | in Ex.1 | epoxy phenol | diaceton alchol: toluen(1:1) | red iron oxide | |

(Table 2) — Continued

| | Anti-corrosive pigment (g.) | Vehicle (resin) (g.) | Solvent (g.) | Extender pigment (g.) | Drier (g.) |
|---|---|---|---|---|---|
| Ex.14 | 30 in Ex.1 | 150 rubber chloride | 350 mineral spirit | 200 red iron oxide | |
| Ex.15 | 30 in Ex.1 | 150 water soluble alkyd | 760 ion-exchanged water | 200 red iron oxide | water soluble-Co-naphthenate 2 |
| Ex.16 | 70 | 150 | 350 | 150 | water soluble-Pb-naphthenate 2 |
| Com.ex. 5 | | alkyd 150 | mineral spirit 350 | red iron oxide 220 | 6% Co-naphthenate 2 / 24% Pb-naphthenate 2 |
| Com.ex. 6 | | epoxy ester 150 | mineral spirit 350 | red iron oxide 230 | 6% Co-naphthenate 2 / 24% Pb-naphthenate 2 |
| Com.ex. 7 | | vinyl chloride 150 | aceton:toluen (1:1) 350 | $CaCO_3$ 220 | |
| Com.ex. 8 | | epoxy phenol 150 | diaceton alchol: toluen (1:1) 350 | red iron oxide 230 | |
| Com.ex. 9 | | rubber chloride 150 | mineral spirit 760 | red iron oxide 230 | |
| Com.ex. 10 | | water soluble alkyd 150 | ion-exchanged water 350 | red iron oxide 220 | water soluble Co-naphthenate 2 / water soluble-Pb-naphthenate 2 |
| Com.ex. 11 | zinc chromate 70 | alkyd 150 | mineral spirit 350 | red iron oxide 150 | 6% Co-naphthenate 2 / 24% Pb-naphthenate 2 |
| Com.ex. 12 | red lead 110 | alkyd 150 | mineral spirit 350 | red iron oxide 150 | 6% Co-naphthenate 2 / 24% Pb-naphthenate 2 |

| Content of anticorrsive pigment in dried film (%) | Film thickness (micron) | Temperature of salt solution (°C) | Corrosion resistance test results | | |
|---|---|---|---|---|---|
| | | | No. of days untill blister first formed on coated film (day) | No. of days for dipping (day) | Extent of blister at end of dipping (Blistered area/Total painted area × 100) (%) |
| 8 | 80 | 40 | 25 | 30 | 15 |
| 19 | 100 | 40 | 45 | 60 | 15 |
| 8 | 70 | 40 | 25 | 30 | 15 |
| 8 | 120 | 40 | 100 | 120 | 5 |
| 19 | 60 | 20 | 10 | 20 | 25 |
| | 80 | 40 | 1 | 30 | 100 |
| | 80 | 40 | 5 | 30 | 80 |
| | 100 | 40 | 5 | 60 | 100 |
| | 70 | 40 | 5 | 30 | 100 |
| | 120 | 40 | 10 | 120 | 100 |
| | 60 | 20 | 1 | 20 | 100 |
| 19 | 80 | 40 | 20 | 30 | 20 |
| 27 | 80 | 40 | 20 | 30 | 20 |

EXAMPLE 17

By blending as an anticorrosive pigment 20 g. of the powder (average particle size: 0.5 micron) of the iron oxide-calcium oxide sintered composite containing 50 wt percent of $2CaO \cdot Fe_2O_3$ prepared in Examples 8 in the paint composition prepared to the following prescription and having it well dispersed by use of a ball mill, 724 g. of anticorrosive paint was obtained.

| Vehicle | Alkyd resin | 150 g. |
|---|---|---|
| Solvent | Mineral spirit | 350 g. |
| Extender pigment | Red iron oxide | 200 g. |
| Drier | 6% cobalt naphthenate solution | 2 g. |
| | 24% lead naphthenate solution | 2 g. |

The anticorrosive paint thus prepared was applied to a rust-free, fat-removed steel plate to a thickness of about 100 microns. The steel plate painted was kept dipped in a 3 percent salt solution kept at 40°C for a period of one month to test it for corrosion resistance. By observation of the coated film surface, the number of days until formation of blister is first observed and the extent of blister after one month (blistered area/total painted area × 100) were determined.

In this case, blister was observed to have been formed on the coated film on the 15th day, and the proportion of the blistered area to the total painted area was 25% after one month. The content of anticorrosive pigment in the dried film was 5%.

EXAMPLES 18 to 20

Anticorrosive paints were prepared in the same manner as in Example 17 except that the amounts of anticorrosive and extender pigments were varied. The corrosion resistance test results for them were shown in Table 3.

Table 3

| | Amount of Anticorrosive pigment in Ex. 8 (g.) | Amount of Extender pigment (red iron oxide) (g.) | Content of anticorrosive pigment in dried film (%) | Corrosion resistance test results | |
|---|---|---|---|---|---|
| | | | | No. of days until blister formed on coated film (day) | Extent of blister after 1 month (Blistered area/ total painted area × 100) (%) |
| Ex. 18 | 40 | 180 | 10 | 20 | 15 |
| Ex. 19 | 55 | 165 | 15 | 25 | 10 |
| Ex. 20 | 110 | 110 | 30 | 25 | 10 |

REFERENCE EXAMPLE

One hundred grams of the powder of iron oxide-calcium oxide sintered composite containing 60 wt percent of $2CaO \cdot Fe_2O_3$ Prepared in Example 1 was suspended in one liter of water. After well stirred, the suspension was filtered. The suspensoid filtered was again suspended in one liter of water. The suspension was well stirred and filtered to take suspensoid. This procedure of suspension, stirring and filtration was repeated a total of fifteen times. The suspensoid collected by the last filtration was dried at 100°C. The contents of iron oxide and calcium oxide in the dried suspensoid were determined by chemical analysis, and the content of water of crystallization by means of a heat balance.

The result: $Fe_2O_3$; 56.18%, CaO: 28.81%, water of crystallization: 15.01%. These analytical values are consistent with the view that the dried suspensoid is $3CaO \cdot 2Fe_2O_3 \cdot _{2-3/2}O$. As a result of analysis by X-ray diffraction, the amount of $2CaO \cdot Fe_2O_3$ contained was extremely small, and that of $CaCO_3$, too, was slight. No iron oxides or hydroxides were detected. Thus, it was confirmed that $2CaO \cdot Fe_2O_3$ contained in the iron oxide-calcium oxide sintered composite in the present invention modifies to $3CaO \cdot 2Fe_2O_3 \cdot 2-3H_2O$ in water.

BRIEF DESCRIPTION OF THE DRAWINGS

FIG. 2 is a graph showing the solubility and sustanance thereof of the iron oxide-calcium oxide sintered composite prepared from red iron oxide ($Fe_2O_3$) and calcium carbonate ($CaCO_3$) as starting materials, varying the mixing ratio and the calcinating temperature, with the percentage of the calcium oxide to the sampled sintered composite plotted as left ordinate, the pH value of the filtrates as right ordinate, and the number of times of suspension as abscissa.

FIG. 3 is an X-ray diffraction diagram of the iron oxide-calcium oxide sintered composite containing $2CaO \cdot Fe_2O_3$, obtained in Example 1.

Figure 1:
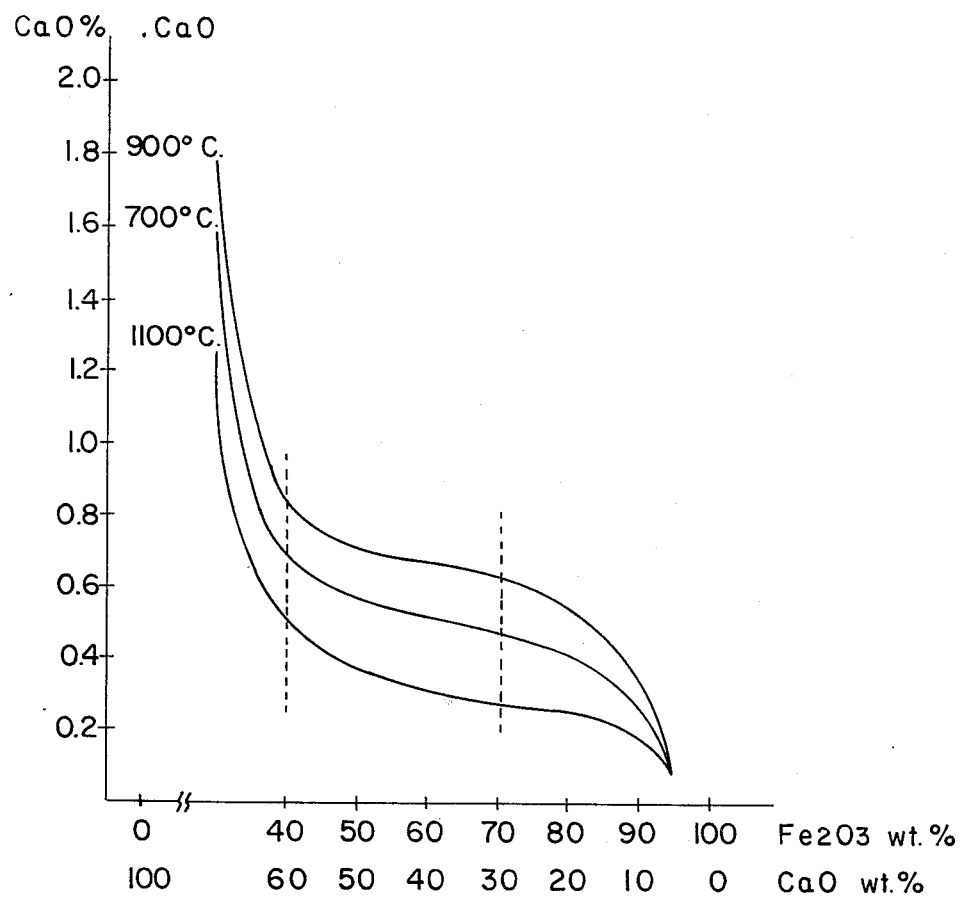
FIG. 1 is a graph showing the solubility of the iron oxide-calcium oxide sintered composites prepared from red iron oxide ($Fe_2O_3$) and calcium carbonate ($CaCO_3$) as starting materials, varying the mixing ratio and the calcinating temperature, with the percentage of the calcium oxide to the sampled sintered composite plotted as ordinate and the mixing ratio of red iron oxide ($Fe_2O_3$) to calcium carbonate ($CaCO_3$) as abscissa.

What is claimed is:

1. In an anticorrosive paint free from lead and chromium pollutants containing a pigment and a vehicle containing a resinous binder and solvent, the improvement comprising, as the anticorrosive pigment of a powder with a PVC value of 45–60 per cent and an average particle size of 0.5 micron - 1 micron, said powder having been prepared by pulverizing an iron oxide-calcium oxide sinter composite containing at least 5 per cent by weight of $2CaO \cdot Fe_2O_3$, said sinter composite being obtained by calcining at a temperature of 700° to 1150°C a mixture of 40 to 70 per cent by weight, in terms of iron oxide content, of an iron compound selected from the group consisting of $Fe_2O_3$, $Fe_3O_4$ and FeOOH and 30 to 60 per cent by weight, in terms of calcium oxide content, of a calcium compound selected from the group consisting of calcium carbonate, calcium hydroxide and calcium oxide.

2. An anticorrosive paint according to claim 1, wherein the iron oxide-calcium oxide sinter composite contains 20 to 90 per cent by weight of $2CaOFe_2O_3$ and is prepared by calcining at a temperature of 800° to 1100°C a mixture of 55 to 65 per cent by weight, in terms of iron oxide content, of $Fe_2O_3$ with 35 to 45 per cent by weight, in terms of calcium oxide content, of calcium carbonate.

3. An anticorrosive paint according to claim 1, wherein the iron oxide-calcium oxide sinter composite contains 60 per cent by weight of $1CaO \cdot Fe_2O_3$ and is prepared by calcining at a temperature of 900°C a mixture of 58.5 per cent by weight, in terms of iron oxide content, of $Fe_2O_3$ with 41.5 percent by weight, in terms of calcium oxide content, of $CaCO_3$.

4. An anticorrosive paint according to claim 1, wherein the iron oxide-calcium oxide sinter composite contains 50 per cent by weight of $2\text{-}CaO \cdot Fe_2O_3$ and is prepared by calcining at a temperature of 900°C a mixture of 58.5 per cent by weight, in terms of iron oxide content, of $Fe_2O_3$ with 41.5 per cent by weight, in terms of calcium oxide content, of CaO.

5. An anticorrosive paint according to claim 1, wherein the iron oxide-calcium oxide sinter composite contains 70 per cent by weight of $2CaO \cdot Fe_2O_3$ and is prepared by calcining at a temperature of 900°C a mixture of 58.5 per cent by weight, in terms of iron oxide content, of $Fe_3O_4$ with 41.5 per cent by weight, in terms of calcium oxide content, of $Ca(OH)_2$.

6. An anticorrosive paint according to claim 1, wherein the iron oxide-calcium oxide sinter composite contains 70 per cent by weight of $2CaO \cdot Fe_2O_3$ and is prepared by calcining at a temperature of 900°C a mixture of 58.5 per cent by weight, in terms of iron oxide content, of FeOOH with 41.5 per cent by weight, in terms of calcium oxide content, of $CaCO_3$, calcined at a temperature of 900°C.

\* \* \* \* \*

UNITED STATES PATENT OFFICE
CERTIFICATE OF CORRECTION

Patent No. 3,904,421  Dated September 9, 1975

Inventor(s) Shigeki Shimizu et al

It is certified that error appears in the above-identified patent and that said Letters Patent are hereby corrected as shown below:

Column 18, line 36, change "$1CaO \cdot Fe_2O_3$" to -- $2CaO \cdot Fe_2O_3$ --

Signed and Sealed this second Day of December 1975

[SEAL]

Attest:

RUTH C. MASON
Attesting Officer

C. MARSHALL DANN
Commissioner of Patents and Trademarks